(12) United States Patent
Kubo et al.

(10) Patent No.: US 8,092,062 B2
(45) Date of Patent: Jan. 10, 2012

(54) LIGHT-EMITTING ELEMENT AND DISPLAY UNIT HAVING THE SAME

(75) Inventors: Tomoki Kubo, Osaka (JP); Takeshi Masuda, Osaka (JP); Yuhsaku Ajichi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 300 days.

(21) Appl. No.: 12/594,272

(22) PCT Filed: Apr. 23, 2008

(86) PCT No.: PCT/JP2008/001069
§ 371 (c)(1), (2), (4) Date: Oct. 1, 2009

(87) PCT Pub. No.: WO2009/028125
PCT Pub. Date: Mar. 5, 2009

(65) Prior Publication Data
US 2010/0118562 A1     May 13, 2010

(30) Foreign Application Priority Data
Aug. 29, 2007  (JP) .................................. 2007-222914

(51) Int. Cl.
*F21V 7/04* (2006.01)
(52) U.S. Cl. ........ 362/606; 362/615; 362/616; 362/620; 362/626
(58) Field of Classification Search .................. 362/615, 362/628, 606, 613, 616, 620, 626
See application file for complete search history.

(56) References Cited

U.S. PATENT DOCUMENTS

| | | | |
|---|---|---|---|
| 5,816,677 A | 10/1998 | Kurematsu et al. | |
| 5,914,760 A | 6/1999 | Daiku | |
| 6,241,358 B1 | 6/2001 | Higuchi et al. | |
| 6,469,755 B1 | 10/2002 | Adachi et al. | |
| 7,494,234 B2 * | 2/2009 | Chang | 362/19 |

(Continued)

FOREIGN PATENT DOCUMENTS
EP         0 684 423         11/1995
(Continued)

OTHER PUBLICATIONS

International Search Report for PCT/JP2008/001069, mailed Jun. 24, 2008.

*Primary Examiner* — Evan Dzierzynski
(74) *Attorney, Agent, or Firm* — Nixon & Vanderhye, P.C.

(57) ABSTRACT

A first light guide plate of a light-emitting element is formed by a plurality of strip-shaped light guide bodies arranged in parallel with each other, where each strip-shaped light guide body has a light incident surface on which light from a light source is incident, and a light-emitting surface from which light from the light incident surface is emitted, and on which a plurality of prisms are formed. A second light guide plate of the light-emitting element is positioned so as to face the light-emitting surface side of the first light guide plate, has prisms formed on a surface of the first light guide plate side in a shape that meshes with a shape of the prisms of the first light guide plate, and is formed by a fewer number of light guide bodies arranged in parallel than the strip-shaped light guide bodies.

9 Claims, 4 Drawing Sheets

U.S. PATENT DOCUMENTS

| | | |
|---|---|---|
| 2002/0197051 A1 | 12/2002 | Tamura et al. |
| 2006/0245213 A1* | 11/2006 | Beil et al. ........................ 362/616 |
| 2007/0147089 A1* | 6/2007 | Lin et al. ........................ 362/616 |
| 2008/0101088 A1* | 5/2008 | Kim et al. ....................... 362/620 |
| 2010/0103349 A1* | 4/2010 | Schmidt et al. ................. 349/64 |
| 2011/0025730 A1* | 2/2011 | Ajichi ............................ 345/690 |

FOREIGN PATENT DOCUMENTS

| | | |
|---|---|---|
| EP | 0 814 300 | 12/1997 |
| EP | 0 987 490 | 3/2000 |
| EP | 1 139 013 | 10/2001 |
| JP | 7-333442 | 12/1995 |
| JP | 2001-93321 | 4/2001 |
| JP | 2002-182039 | 6/2002 |
| JP | 2006-134748 | 5/2006 |
| JP | 2007-123086 | 5/2007 |

* cited by examiner

LIGHT-EMITTING ELEMENT AND DISPLAY UNIT HAVING THE SAME

This application is the U.S. national phase of International Application No. PCT/JP2008/001069 filed 23 Apr. 2008, which designated the U.S. and claims priority to Japan Application No. 2007-222914 filed 29 Aug. 2007, the entire contents of each of which are hereby incorporated by reference.

TECHNICAL FIELD

The present invention relates to light-emitting elements and display devices having the same.

BACKGROUND ART

In recent years, liquid crystal display (LCD) devices, which are rapidly replacing cathode ray tubes (CRTs), have been widely used in liquid crystal televisions, monitors, mobile phones, and the like by taking advantage of their features such as energy saving, a small thickness, and light weight. These features have been more effectively used in improvement of illumination devices that are positioned behind the LCD devices (so-called backlights).

The illumination devices are roughly divided into a side light type (which is also called an "edge light type"), and a direct type. In the side light type illumination devices, a light guide body is provided behind an LCD panel, and a light source is provided at a lateral end of the light guide body. Light emitted from the light source is reflected by the light guide body to be indirectly and uniformly applied to the LCD panel. This structure can reduce the thickness, and also can implement illumination devices having high uniformity of the brightness. Thus, the side light type illumination devices have been used primarily in small and medium sized LCDs, such as mobile phones and notebook computers.

An example of the side light type illumination devices includes an illumination device described in Patent Document 1. Patent Document 1 describes a surface-emitting device in which a plurality of dots are formed on a reflective surface of a light guide plate so that light can be uniformly emitted from a light-emitting surface. In this surface-emitting device, the corners of the reflective surface have a higher dot density than that of other part, because no light is transmitted to the corners due to directivity of a light source, and the corners become dark.

Moreover, in the direct type illumination devices, a plurality of light sources are arranged behind an LCD panel to apply light directly to the LCD panel. Thus, high brightness tend to be obtained even in large screen displays, and the direct type illumination devices have been used primarily in large LCDs of 20 inches or more. However, current direct type illumination devices have a thickness as large as about 20 to 40 mm, which hinders further reduction in thickness of displays.

It is possible to achieve further reduction in thickness of large LCDs by reducing the distance between the light sources and the LCD panel. In this case, however, uniformity of the brightness of the illumination devices cannot be obtained unless the number of light sources is increased. On the other hand, increasing the number of light sources increases the cost. Thus, it has been desired to develop thin illumination devices having high uniformity of the brightness, without increasing the number of light sources.

In view of the above problem, attempts have been made to reduce the thickness of large LCDs by arranging a plurality of side light type light-emitting elements.

As such a light-emitting element, Patent Document 2, for example, discloses a tandem type surface light source device having a tandem structure in which plate-like light guide blocks are arranged in tandem, and primary light sources for supplying primary light to the respective light guide blocks are provided. Patent Document 2 describes that this surface light source device can ensure a wide light emission area by using a compact structure.

Moreover, Patent Document 3 discloses an illumination device having collimating means provided on incident portions of light guide bodies. Patent Document 3 describes that this illumination device can increase the efficiency of incidence on the light guide bodies.

Moreover, Patent Document 4 discloses an illumination device in a form that adjusts light propagation by the difference in density of openings and reflecting portions.

Patent Document 4 describes that this illumination device can reduce the weight of illumination devices, and can implement uniform in-plane brightness distribution of illuminating light.

Moreover, Patent Document 5 discloses an illumination device in a form in which a light-emitting surface of a light guide body of an edge type backlight unit has a concavo-convex shape. Patent Document 5 describes that this structure enables illumination devices to be manufactured inexpensively by a simple method.

Moreover, Patent Document 6 discloses an edge type backlight in which light sources are light-emitting diodes (LEDs), and ridges are formed on a light guide plate. Patent Document 6 describes that, by changing an angle of the prism shape between a prism positioned in front of each LED and a prism positioned between LEDs, light can be directed also to the gap between the LEDs, and dark portions can be improved.

Patent Document 1: Japanese Published Patent Application No. 2003-43266
Patent Document 2: Japanese Published Patent Application No. H11-288611
Patent Document 3: Japanese Published Patent Application No. 2001-42328
Patent Document 4: Japanese Published Patent Application No. H08-297282
Patent Document 5: Japanese Published Patent Application No. 1-107-333442
Patent Document 6: Japanese Published Patent Application No. 2007-123086

DISCLOSURE OF THE INVENTION

Problems to be Solved by the Invention

However, in the light-emitting element disclosed in Patent Document 2, arranging the blocks of the light guide bodies in tandem causes unevenness of the brightness corresponding to the joints between the light guide bodies.

Moreover, in the light-emitting element disclosed in Patent Document 3, prisms formed on the light guide plates serve to simply raise propagating light, as described in embodiments. However, since the light is raised, there is a concern about unevenness of the brightness at the joints between the light guide plates.

Moreover, in the light-emitting element disclosed in Patent Document 4, light propagation is adjusted by the difference in density of the openings and the reflecting portions of a display device. However, a fairly large thickness (the distance between a light-emitting surface and a reflector facing the light-emitting surface) is required in order to uniformly propagate light within the space without using any light guide body. Thus, it is difficult to actually adjust light propagation only by the difference in density.

Moreover, since the light-emitting element disclosed in Patent Document 5 is formed by a single light guide plate, it is difficult to use the light-emitting element while reducing the distance between a light source and an LCD panel to reduce the thickness of a display device.

Moreover, the light-emitting element disclosed in Patent Document 6 is used as a measure against unevenness of the brightness in a small range between LEDs. Thus, it is considered impossible to eliminate unevenness of the brightness at the joints between light guide plates if the light guide plates are arranged adjacent to each other in this form.

Means for Solving the Problems

The present invention was developed in view of the above problems, and it is an object of the present invention to provide a light-emitting element that is capable of providing sufficient brightness even when the light-emission area is increased, is capable of reducing the thickness, and also has high uniformity of the brightness, and a display device having the same.

A light-emitting element according to the present invention includes: a plurality of light sources; a first light guide plate formed by a plurality of strip-shaped light guide bodies arranged in parallel with each other, where each of the plurality of strip-shaped light guide bodies has a light incident surface on which light from a corresponding one of the light sources is incident, and a light-emitting surface from which light from the light incident surface is emitted, and on which a plurality of prisms are formed; and a second light guide plate which is positioned so as to face the light-emitting surface side of the first light guide plate, has prisms formed on a surface of the first light guide plate side in a shape that meshes with a shape of the prisms of the first light guide plate, and is formed by a fewer number of light guide bodies arranged in parallel than the strip-shaped light guide bodies.

According to this structure, a plurality of independent light-emitting surfaces of the plurality of strip-shaped light guide bodies arranged in parallel with each other are integrated by the second light guide plate formed by a fewer number of light guide bodies arranged in parallel than the strip-shaped light guide bodies. Thus, unevenness of the brightness corresponding to the joints between the plurality of strip-shaped light guide bodies in the first light guide plate, which is generated in Patent Document 2 described above, is suppressed in a desirable manner.

Moreover, since the plurality of prisms are formed on the surface of the first light guide plate, and the prisms are formed on the surface of the first light guide plate side of the second light guide plate, in a shape that meshes with the shape of the prisms of the first light guide plate. Thus, of the light from the light sources which is incident from the light incident surfaces, light that reaches the prisms on the surface of the first light guide plate in a perpendicular direction travels toward the second light guide plate without being refracted, and is directly emitted as plane light. Thus, light from the light sources can be efficiently used, and unevenness of the brightness is suppressed, whereby uniformity of the brightness is improved.

Moreover, since light is transmitted to the second light guide plate by using one inclined surface of each of the plurality of prisms formed on the surface of the first light guide plate, the light is not raised as in the light guide plate of Patent Document 3, and unevenness of the brightness at the joints between the light guide plates can be suppressed.

Moreover, since light is propagated by the first and second light guide plates, adjustment of light propagation is facilitated as compared to the case where light is propagated within a space as in the light-emitting element of Patent Document 4.

Moreover, unlike Patent Document 5, since the light-emitting element of the present invention is formed by two light guide plates facing each other, the light-emitting element of the present invention can be easily used while reducing the distance between the light sources and the LCD panel in order to reduce the thickness of a display device.

Moreover, Patent Document 6 is used as a measure against unevenness of the brightness in a small range between the LEDs, while the present invention is intended for unevenness of the brightness between the light guide plates. Thus, generation of unevenness of the brightness at the joints therebetween can also be sufficiently suppressed.

Moreover, in the light-emitting element of the present invention, each of the plurality of prisms, which are formed on each of the plurality of strip-shaped light guide bodies of the first light guide plate, may have a wide first inclined surface formed on the light source side, and a narrow second inclined surface formed on an opposite side to the light source side.

According to this structure, since each of the plurality of prisms, which are formed on each of the plurality of strip-shaped light guide bodies of the first light guide plate, has a wide first inclined surface formed on the light source side, and a narrow second inclined surface formed on the opposite side to the light source side, incident light from the light sources can be selectively transmitted to the second light guide plate. Thus, light propagation can be adjusted in a desirable manner, and unevenness of the brightness can be suppressed in a desirable manner.

Moreover, in the light-emitting element of the present invention, the light sources may be provided in a side surface direction of the first light guide plate.

According to this structure, since the light sources are provided in the side surface direction of the first light guide plate, a thinner light-emitting element can be formed.

Moreover, in the light-emitting element of the present invention, the plurality of prisms, which are formed on each of the plurality of strip-shaped light guide bodies of the first light guide plate, may be formed so that a gap to an adjacent prism decreases from the light source side toward an opposite side thereto.

According to this structure, since the plurality of prisms, which are formed on each of the plurality of strip-shaped light guide bodies of the first light guide plate, are formed so that the gap to an adjacent prism decreases from the light source side toward the opposite side thereto, the amount of light emission from the first light guide plate can be prevented from increasing on the light source side, whereby a uniform amount of light emission can be obtained on the surface of the light guide plate.

Moreover, in the light-emitting element of the present invention, the plurality of prisms of the first light guide plate may be formed to have shapes similar to, or congruent with each other.

According to this structure, since the plurality of prisms of the first light guide plate are formed to have shapes similar to, or congruent with each other, an increase and decrease of the amount of light emission can be easily adjusted by fixing or varying the size of the plurality of prisms.

Moreover, in the light-emitting element of the present invention, the plurality of prisms of the second light guide plate may be formed to have shapes similar to, or congruent with the shapes of the plurality of prisms of the first light guide plate.

According to this structure, since the plurality of prisms of the second light guide plate are formed to have shapes similar to, or congruent with the shapes of the plurality of prisms of the first light guide plate, light propagation is further adjusted in the prisms of the second light guide plate even if light propagation is not sufficiently adjusted in the prisms of the first light guide plate. Thus, the amount of light emission and the like can be adjusted in a more desirable manner.

Moreover, in the light-emitting element of the present invention, each of the plurality of strip-shaped light guide bodies of the first light guide plate may have a prism non-formation portion for totally reflecting light from the corresponding light source, where each prism non-formation portion is formed so as to extend by a predetermined width from the respective light incident surface, and is positioned so as to face a back surface of an adjacent strip-shaped light guide body.

According to this structure, since each of the plurality of strip-shaped light guide bodies of the first light guide plate has a prism non-formation portion for totally reflecting light from the corresponding light source, where each prism non-formation portion is formed so as to extend by a predetermined width from the respective light incident surface, and is positioned so as to face the back surface of an adjacent strip-shaped light guide body, light, which is incident from each light source and propagated by total reflection in each prism non-formation portion, travels toward steeper surfaces where the prisms are formed. Thus, light of the light sources can be more efficiently used for light emission of the element.

Moreover, in the light-emitting element of the present invention, a light reflecting member may be provided between the prism non-formation portion provided in each of the plurality of strip-shaped light guide bodies of the first light guide plate, and the adjacent strip-shaped light guide body faced by the prism non-formation portion.

According to this structure, since the light reflecting member is provided between the prism non-formation portion provided in each of the plurality of strip-shaped light guide bodies of the first light guide plate, and the adjacent strip-shaped light guide body faced by the prism non-formation portion, a larger amount of light from the light sources can be made to reach the prisms by reflecting light traveling toward the prism non-formation portions. Thus, light from the light sources can be more efficiently used for light emission of the element.

A display device according to the present invention includes any one of the light-emitting elements described above.

According to this structure, the thickness of the display device can be reduced, and generation of unevenness of the brightness can be suppressed in a desirable manner.

Effects of the Invention

The present invention can provide a light-emitting element that is capable of providing sufficient brightness even when the light-emission area is increased, is capable of reducing the thickness, and also has high uniformity of the brightness, and a display device having the same.

DESCRIPTION OF CHARACTERS

Figure 1:
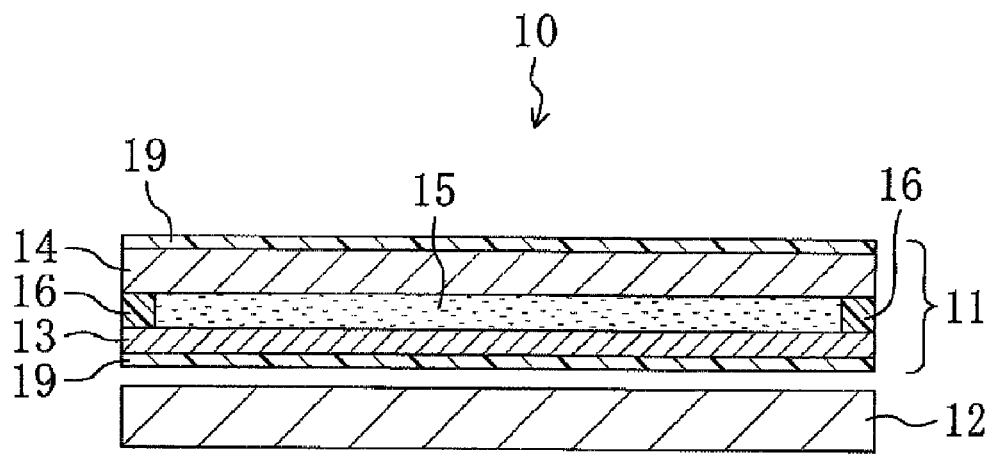
FIG. 1 is a cross-sectional view of an LCD device according to an embodiment of the present invention.

10 LCD device
11 LCD panel
12 light-emitting element
13 TFT substrate
14 CF substrate
20 light-emitting diode
21 first light guide plate
22 second light guide plate
23 strip-shaped light guide body
24 light incident surface
25 light-emitting surface
26, 36 prism
31 first inclined surface
32 second inclined surface
34 prism non-formation portion
38 light reflecting member

BEST MODE FOR CARRYING OUT THE INVENTION

Although an embodiment of the present invention will be described in detail below with reference to the accompanying drawings, the present invention is not limited to the following embodiment.

EMBODIMENT

A light-emitting element and a display device having the same according to the present embodiment will be described in detail with reference to the drawings by using an LCD device as an example. Note that the embodiment of the light-emitting element and the display device having the same according to the present invention is not limited to the following embodiment.

(Structure of a Light-Emitting Element and an LCD Device 10 Having the Same)

FIG. 1 is a cross-sectional view of the LCD device 10 according to the embodiment of the present invention.

The LCD device 10 includes an LCD panel 11 and a light-emitting element 12.

The LCD panel 11 includes a TFT substrate 13 on which thin film transistors (TFTs) are formed in each pixel, and a color filter (CF) substrate 14 bonded to the TFT substrate 13 with a liquid crystal layer 15 and spacers (not shown) interposed therebetween. A liquid crystal layer 15 includes a liquid crystal material enclosed between the TFT substrate 13 and the CF substrate 14, and is hermetically sealed by a sealant 16 provided in an outer peripheral portion.

In the TFT substrate 13, circuit elements, such as pixel electrodes provided corresponding to pixels arranged in a matrix pattern, TFTs connected to the pixel electrodes, and gate lines and source lines, (all of which are not shown) are formed on a liquid crystal layer 15 side (the inner side) of a glass substrate.

In the CF substrate 14, color layers, a light-shielding layer, and a counter electrode (all of which are not shown) are formed on a liquid crystal layer 15 side of a glass substrate.

The TFT substrate 13 and the CF substrate 14 have a polarizing plate 19 formed on their outer surfaces.

Figure 2:
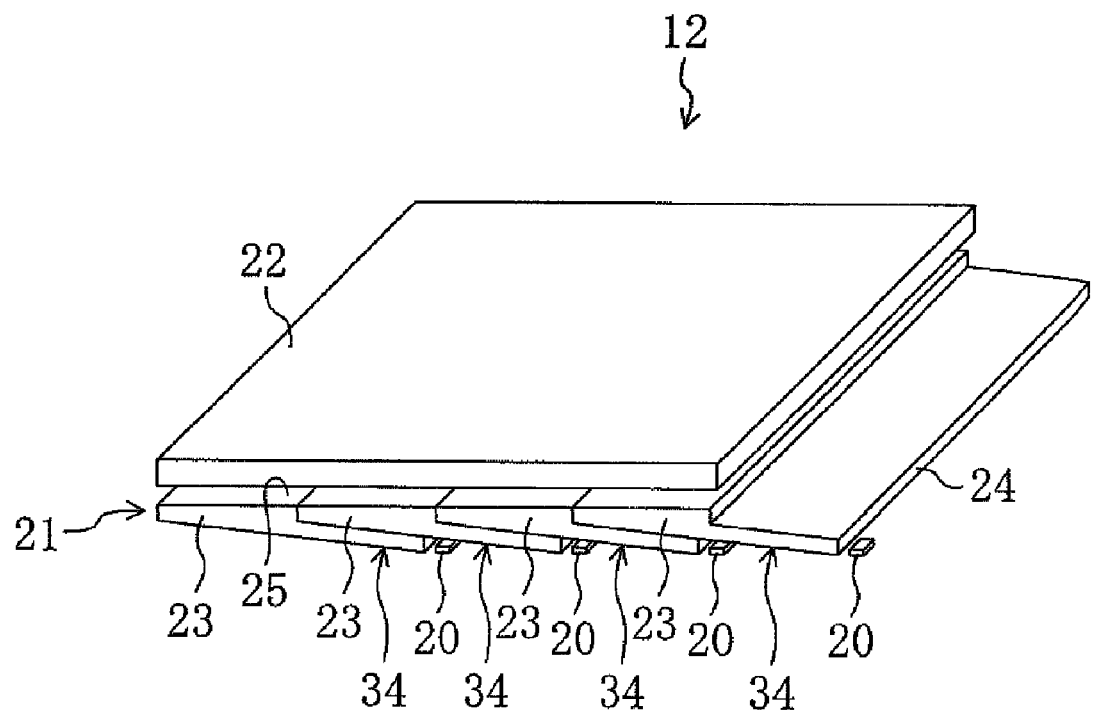
FIG. 2 is a schematic view of a light-emitting element according to an embodiment of the present invention.
Figure 3:
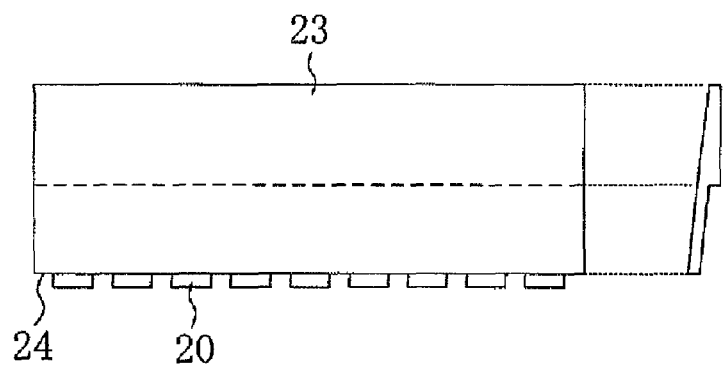
FIG. 3 is a top view of a first light guide plate according to an embodiment of the present invention.

As shown in FIG. 2, the light-emitting element 12 is formed by a first light guide plate 21 provided with light-emitting diodes 20 (light sources), a second light guide plate 22 disposed so as to face the first light guide plate 21, a frame (not shown) integrally accommodating the first light guide plate 21 and the second light guide plate 22, an optical sheet group (not shown) provided on the second light guide plate 22 and consisting of a diffusion sheet, a prism sheet, a polarization conversion sheet, and the like, and the like. The light-emitting element 12 is provided on the TFT substrate 13 side of the LCD panel 11 so that the second light guide plate 22 faces the LCD panel 11. Note that, although the light-emitting diodes 20 (LEDs) are used as light sources in the present embodiment, cold cathode fluorescent lamps (CCFLs), external electrode fluorescent lamps (EEFLs), or the like may alternatively be used. Moreover, one LED 20 may be provided for each strip-shaped light guide body 23, or as shown in FIG. 3, a plurality of LEDs 20 may be provided for each strip-shaped light guide body 23.

The first and second light guide plates 21, 22 of the light-emitting element 12 are made of a transparent thermoplastic resin such as an acrylic resin, a methacrylic resin, a styrene resin, and a polycarbonate resin.

Figure 4:
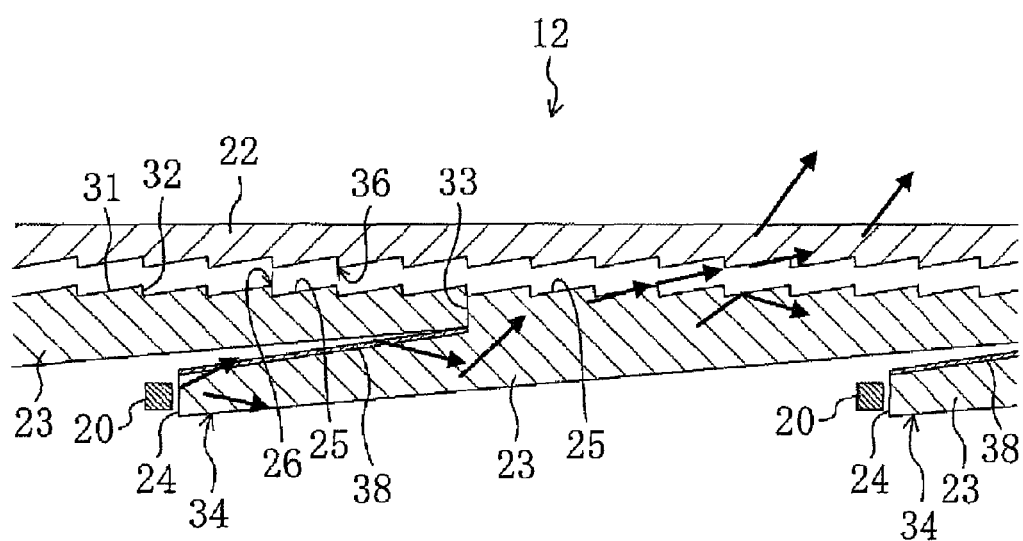
FIG. 4 is a cross-sectional view of a light-emitting element according to an embodiment of the present invention.

As shown in FIG. 4, the first light guide plate 21 includes a plurality of strip-shaped light guide bodies 23 arranged in parallel with each other. The side surfaces of the plurality of strip-shaped light guide bodies 23 serve as light incident surfaces 24 on which light from the respective LEDs 20 is incident, and the upper surfaces of the plurality of strip-shaped light guide bodies 23 serve as light-emitting surfaces 25 from which light from the respective light incident surfaces 24 is emitted, and on which a plurality of prisms 26 are formed.

Figure 5:
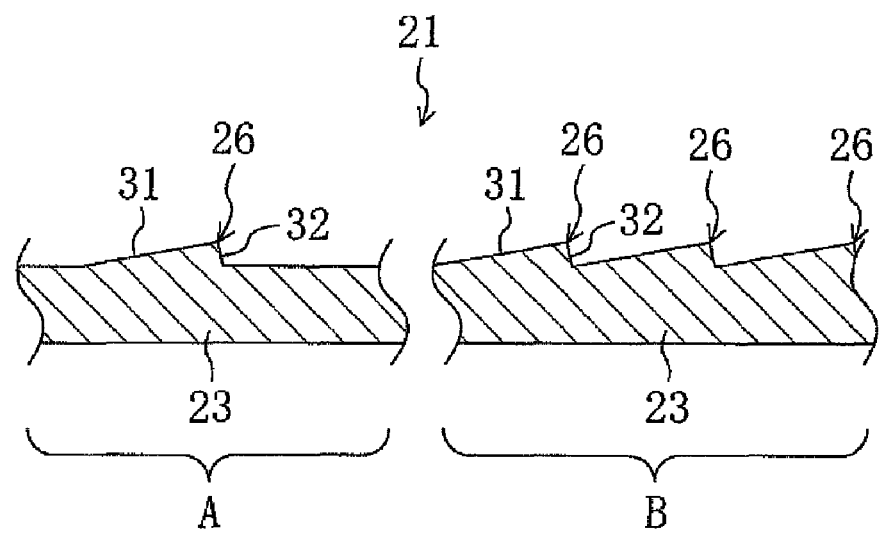
FIG. 5 is a cross-sectional view of a first light guide plate having prisms formed at a varying pitch according to an embodiment of the present invention.

The plurality of prisms 26 are formed at regular intervals on the surfaces of the strip-shaped light guide bodies 23. Note that, as shown in FIG. 5, the plurality of prisms 26 may be formed so that the gap to an adjacent prism 26 decreases from an LED 20 side A toward an opposite side B thereto. The plurality of prisms 26 are formed to have shapes substantially congruent with each other. Note that the plurality of prisms 26 may be varied in size so as to have shapes substantially similar to each other. Moreover, the shapes of the plurality of prisms 26 are not limited to the shapes similar to, or congruent with each other, but corresponding sides of the plurality of prisms 26 may be inclined at different angles.

Each of the plurality of prisms 26 has a wide first inclined surface 31 formed on the LED 20 side, and a narrow second inclined surface 32 formed on the opposite side to the LED 20 side.

An end of the light incident side of each of the plurality of strip-shaped light guide bodies 23 is formed by an upper opposing surface 33 that faces an end of an adjacent strip-shaped light conductor body 23, and a lower light incident surface 24 over which a corresponding LED 20 is provided. A prism non-formation portion 34 (a portion where no prism is formed) is formed so as to extend by a predetermined width from the end of each strip-shaped light guide body 23, and an end of the prism non-formation portion 34 forms the light incident surface 24 described above. Each prism non-formation portion 34 is formed so as to extend obliquely downward from the end of a corresponding strip-shaped light guide body 23, and is positioned so as to face the back surface of an adjacent strip-shaped light guide body 23. Both surfaces of each prism non-formation portion 34 are smoothed so as to totally reflect light from a corresponding LED 20.

The second light guide plate 22 is positioned so as to face the light-emitting surface 25 side of the first light guide plate 21. Prisms 36, whose shapes are similar to those of the prisms 26 of the first light guide plate 21, are formed on the surface of the first light guide plate 21 side of the second light guide plate 22. Thus, the prisms 36 have shapes that meshes with the shapes of the prisms 26 of the first light guide plate 21. The second light guide plate 22 is formed by a single light guide body. Note that the number of light guide bodies that form the second light guide plate 22 is not limited to this, but a plurality of light guide bodies, which are fewer than the strip-shaped light guide bodies 23 of the first light guide plate 21, may be arranged in parallel to form the second light guide plate 22.

A light reflecting member 38, made of a metal such as an aluminum film, is provided between the prism non-formation portion 34 provided in each of the plurality of strip-shaped light guide bodies 23 of the first light guide plate 21, and an adjacent strip-shaped light guide body 23 faced by the prism non-formation portion 34.

(Manufacturing Method of the Light-Emitting Element 12 and the LCD Device 10 Having the Same)

A method for manufacturing the light-emitting element 12 and the LCD device 10 having the same according to the embodiment of the present invention will be described below.

(Manufacturing Method of the Light-Emitting Element 12)

First, injection molding dies for the strip-shaped light guide bodies 23 of the first light guide plate 21 and for the second light guide plate 22 are prepared. These injection molding dies have patterns formed inside, where the patterns have shapes respectively corresponding to the prisms 26, 36 of the first and second light guide plates 21, 22.

Next, by using, for example, an acrylic resin or the like as a constituent material of the light guide plates, an injection molding process is performed by using the injection molding dies and an injection molding machine at respective predetermined injection compression amounts, molding temperatures, injection pressures, and die temperatures, thereby forming the plurality of strip-shaped light guide bodies 23 of the first light guide plate 21, and the second light guide plate 22.

Then, the light reflecting member 38, made of a metal such as an aluminum film, is provided on the upper surface of the prism non-formation portion 34 in each of the plurality of strip-shaped light guide bodies 23.

Then, the plurality of strip-shaped light guide bodies 23 are arranged in parallel so that each prism non-formation portion 34 faces the back surface of an adjacent strip-shaped light guide body 23, and so that their surfaces having the prisms 26 formed thereon face upward.

Then, the LED 20 is provided on the side surface (the light incident surface 24) side of the end of the prism non-formation portion 34 in each of the plurality of strip-shaped light guide bodies 23.

Then, the second light guide plate 22 is positioned so as to face the first light guide plate 21 formed by the plurality of strip-shaped light guide bodies 23, so that the respective prisms 26, 36 mesh with each other.

Then, the first and second light guide plates 21, 22 are integrally accommodated by a frame, and the optical sheet group, consisting of a diffusion sheet, a prism sheet, a polarization conversion sheet, and the like, or the like is provided on the second light guide plate 22, whereby the light-emitting element 12 is fabricated.

(Manufacturing Method of the LCD Device 10)

First, a glass substrate is prepared, and a light-shielding portion and color layers are formed thereon. Then, a counter electrode is formed by vapor depositing, for example, indium tin oxide (ITO) or the like on the color layers, and then, an alignment film is formed. The CF substrate 14 is fabricated by this process.

Then, a glass substrate is prepared, and circuit elements, such as pixel electrodes, TFTs connected to the pixel electrodes, and gate lines and source lines, are formed thereon. Then, a plurality of spacers for defining the cell thickness are formed by a photolithography process. The TFT substrate 13 is fabricated by this process.

Then, a sealant 16 is applied to the light-shielding portion of the TFT substrate 13 so as to have a continuous rectangular shape disconnected at one position (an inlet for a liquid crystal material).

Then, the CF substrate 14 is attached to the TFT substrate 13 with the sealant 16 interposed therebetween, and the sealant 16 is cured to bond the TFT substrate 13 and the CF substrate 14, thereby forming a bonded substrate.

Then, a liquid crystal material is introduced through the inlet, and the bonded substrate is sealed, thereby forming the liquid crystal layer 15.

Then, the polarizing plate 19 is provided on the front and back surfaces of the bonded substrate, whereby the LCD panel 11 is fabricated.

Then, the light-emitting element 12 fabricated as described above is disposed on the surface of the TFT substrate 13 side of the LCD panel 11 so that the second light guide plate 22 of the light-emitting element 12 faces the LCD panel 11, whereby the LCD device 10 is completed.

Note that, although an LCD device is shown as an example of the display device in the present embodiment, the present invention is not limited to this, and is applicable also to other display devices having a PD (plasma display), a PALC (plasma addressed liquid crystal display), and the like.

EXAMPLES

Regarding the light-emitting element of the embodiment of the present invention, evaluation tests for verifying an improvement in unevenness of the brightness, and the like were performed in the following manner.

(First Evaluation Test)

First, a light-emitting element (a first example), which has first and second light guide plates of the same structure as that of the light-emitting element of the embodiment of the present invention, was fabricated according to the manufacturing method shown in the above embodiment. In addition, a light-emitting element (a first comparative example), which has the same structure as that of the first example except that no prism is formed in the first and second light guide plates, was also fabricated.

Then, light from the light sources was directed to these light-emitting elements, and the light-emitting elements were observed from their light-emitting surfaces to verify the relationship between the position (mm) from an end of the light-emitting surface of the light-emitting element and the brightness (cd/m$^2$) at that position.

Figure 6:
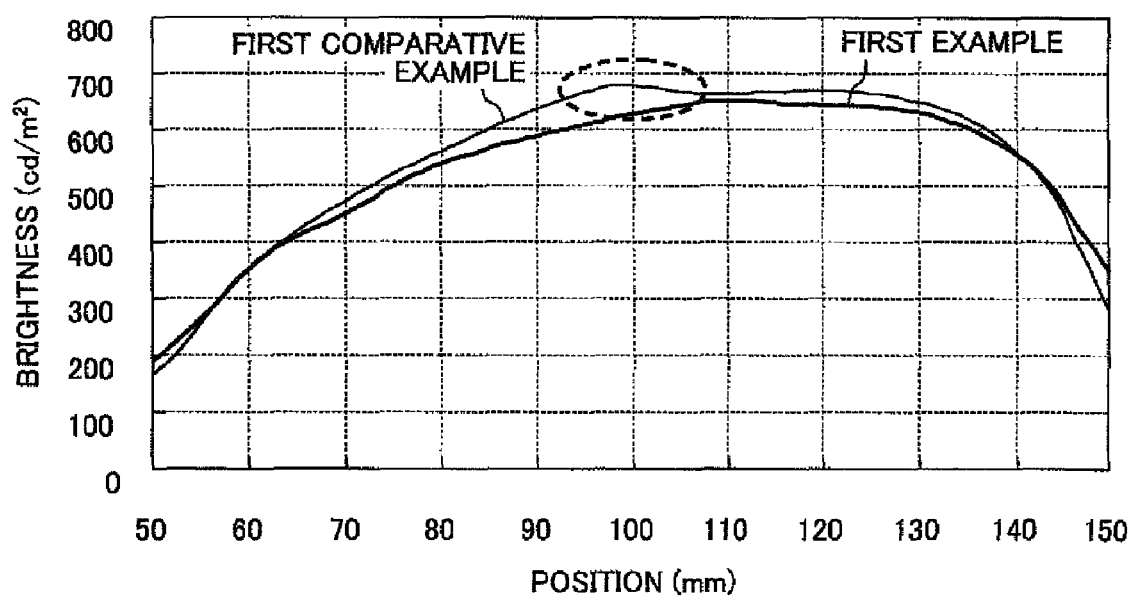
FIG. 6 shows a test result of a first evaluation test.

FIG. 6 shows the result of the first evaluation test. As shown in FIG. 6, in a brightness curve of the light-emitting element of the first example, the difference between a brightness peak (a portion shown in a dotted frame in FIG. 6) and a bottom of the brightness, which corresponds to unevenness of the brightness, is smaller than that in the first comparative example. Thus, it was verified that unevenness of the brightness due to the joints between the light guide bodies is suppressed more in the light-emitting element of the first example having prisms formed therein.

(Second Evaluation Test)

Next, a light-emitting element, which is the same as that of the first example except that no second light guide plate is provided, was fabricated as a second comparative example.

Then, light from the light sources was directed to the light-emitting element of the first example and the light-emitting element of the second comparative example, and the light-emitting elements were observed from their light-emitting surfaces to verify the relationship between the position (mm) from an end of the light-emitting surface of the light-emitting element and the brightness (cd/m$^2$) at that position.

Figure 7:
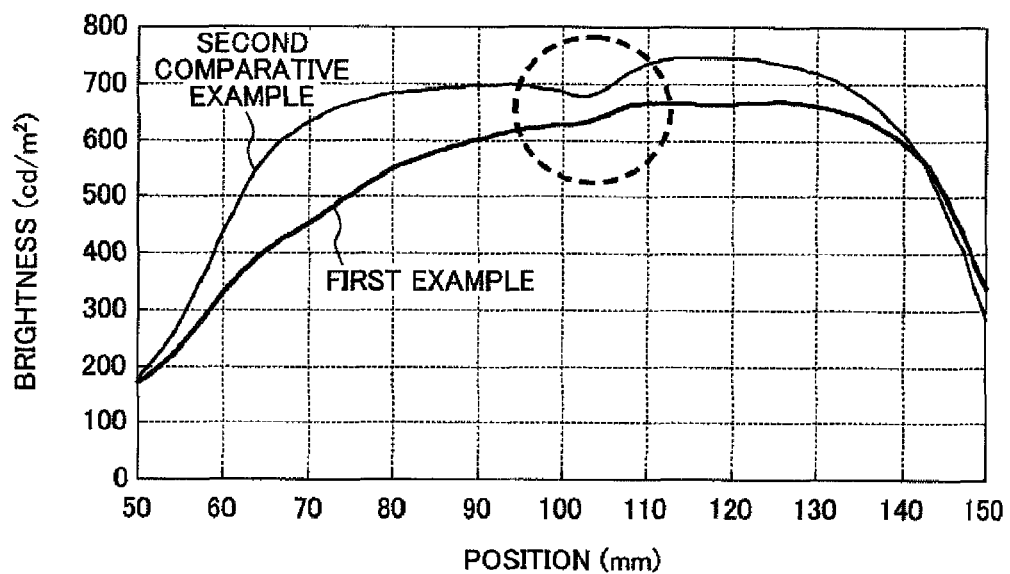
FIG. 7 shows a test result of a second evaluation test.

FIG. 7 shows the result of the second evaluation test. As shown in FIG. 7, in a brightness curve of the light-emitting element of the first example, distortion (a portion shown in a dotted frame in FIG. 7) corresponding to unevenness of the brightness is smaller than that in the second comparative example. Thus, it was verified that unevenness of the brightness due to the joints between the light guide bodies is suppressed more in the light-emitting element of the first example having the second light guide plate.

(Third Evaluation Test)

Light-emitting elements (second, third, and fourth examples), which have first and second light guide plates of the same structure as that of the light-emitting element of the embodiment of the present invention, were fabricated according to the manufacturing method shown in the above embodiment.

In the light-emitting element of the second example, all the prisms on the first and second light guide plates were formed at equal intervals. On the other hand, in the light-emitting elements of the third and fourth examples, the formation pitch of the prisms on the first and second light guide plates was gradually reduced from the light source side toward the opposite side thereto. More specifically, the prisms of the light-emitting element of the third example were formed so that the number of prisms per unit length becomes two at the end of the opposite side to the light sources, provided that the number of prisms per unit length is one at the end of the light source side. Moreover, the prisms of the light-emitting element of the fourth example were formed so that the number of prisms per unit length becomes three at the end of the opposite side to the light sources, provided that the number of prisms per unit length is one at the end of the light source side.

Then, light from the light sources was directed to the light-emitting elements of the second through fourth examples, and the light-emitting elements were observed from their light-emitting surfaces to verify the relationship between the position (mm) on both lateral sides of an arbitrary position on the light-emitting element and the illuminance (lux) at that position.

Figure 8:
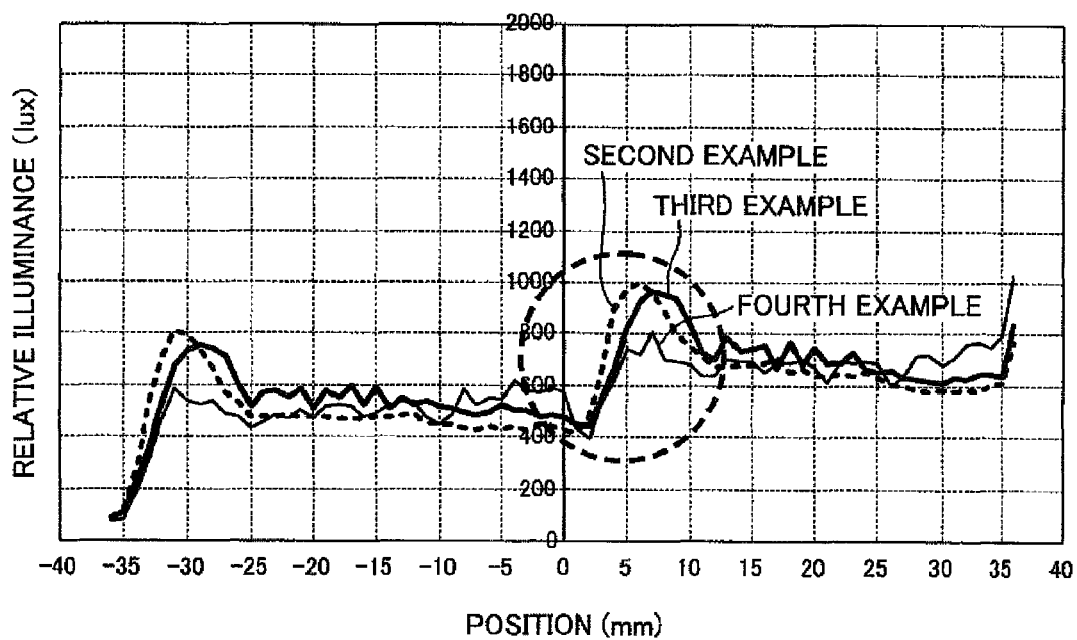
FIG. 8 shows a test result of a third evaluation test.

FIG. 8 shows the result of the third evaluation test. As shown in FIG. 8, a sharp rise in illuminance (a portion shown in a dotted frame in FIG. 8) is suppressed in each of the light-emitting elements of the second through fourth examples, but is further suppressed especially in the third example in which the formation pitch of the prisms is varied. Moreover, a sharp rise in illuminance is suppressed the most in the fourth example in which the formation pitch of the prisms is varied more finely than in the third example. Thus, it was also verified that unevenness of the brightness of the light-emitting elements is also further reduced.

(Functions and Effects)

Functions and effects of the light-emitting element 12 according to the embodiment of the present invention will be described below.

First, as shown by arrows in FIG. 4, light incident from each LED 20 onto the first light guide plate 21 is repeatedly totally reflected within each prism non-formation portion 34, and thus, travels toward the surface where the prisms 26 are formed. The light, which has reached the surface where the prisms 26 are formed, is incident onto the second light guide plate 22. At this time, most of the light that is incident on the prisms 26 at a certain angle impinges perpendicularly onto the narrow second inclined surfaces 32 of the prisms 26, and only a small amount of the light is refracted or totally reflected. Thus, the light from the first light guide plate 21 efficiently reaches the second light guide plate 22, thereby providing surface emission. Moreover, since the number of light guide bodies of the second light guide plate 22 is smaller than the number of the plurality of strip-shaped light guide bodies 23 of the first light guide plate 21, a plurality of independent light-emitting surfaces of the plurality of strip-shaped light guide bodies 23 arranged in parallel with each other are integrated by the second light guide plate 22. Thus, unevenness of the brightness due to the joints between the plurality of strip-shaped light guide bodies 23 in the first light guide plate 21 is suppressed in a desirable manner.

INDUSTRIAL APPLICABILITY

As described above, the present invention relates to light-emitting elements and display devices having the same.

The invention claimed is:

1. A light-emitting element, comprising:
a plurality of light sources;
a first light guide plate formed by a plurality of strip-shaped light guide bodies arranged in parallel with each other, where each of the plurality of strip-shaped light guide bodies has a light incident surface on which light from a corresponding one of the light sources is incident, and a light-emitting surface from which light from the light incident surface is emitted, and on which a plurality of prisms are formed; and
a second light guide plate which is positioned so as to face the light-emitting surface side of the first light guide plate, has prisms formed on a surface of the first light guide plate side in a shape that meshes with a shape of the prisms of the first light guide plate, and is formed by a fewer number of light guide bodies arranged in parallel than the strip-shaped light guide bodies.

2. The light-emitting element of claim 1, wherein
each of the plurality of prisms, which are formed on each of the plurality of strip-shaped light guide bodies of the first light guide plate, has a wide first inclined surface formed on the light source side, and a narrow second inclined surface formed on an opposite side to the light source side.

3. The light-emitting element of claim 1, wherein
the light sources are provided in a side surface direction of the first light guide plate.

4. The light-emitting element of claim 1, wherein
the plurality of prisms, which are formed on each of the plurality of strip-shaped light guide bodies of the first light guide plate, are formed so that a gap to an adjacent prism decreases from the light source side toward an opposite side thereto.

5. The light-emitting element of claim 1, wherein
the plurality of prisms of the first light guide plate are formed to have shapes similar to, or congruent with each other.

6. The light-emitting element of claim 1, wherein
the plurality of prisms of the second light guide plate are formed to have shapes similar to, or congruent with the shapes of the plurality of prisms of the first light guide plate.

7. The light-emitting element of claim 1, wherein
each of the plurality of strip-shaped light guide bodies of the first light guide plate has a prism non-formation portion for totally reflecting light from the corresponding light source, where each prism non-formation portion is formed so as to extend by a predetermined width from the respective light incident surface, and is positioned so as to face a back surface of an adjacent strip-shaped light guide body.

8. The light-emitting element of claim 7, wherein
a light reflecting member is provided between the prism non-formation portion provided in each of the plurality of strip-shaped light guide bodies of the first light guide plate, and the adjacent strip-shaped light guide body faced by the prism non-formation portion.

9. A display device, comprising the light-emitting element of claim 1.

* * * * *